March 3, 1970  J. F. McCREERY  3,498,653
CONNECTOR DEVICE
Filed Aug. 16, 1968  2 Sheets-Sheet 1
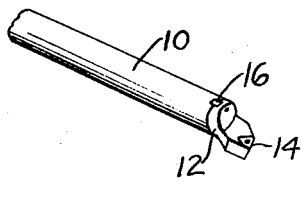
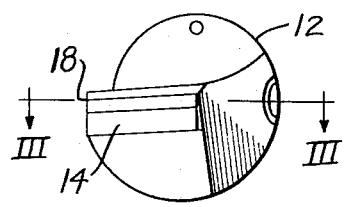
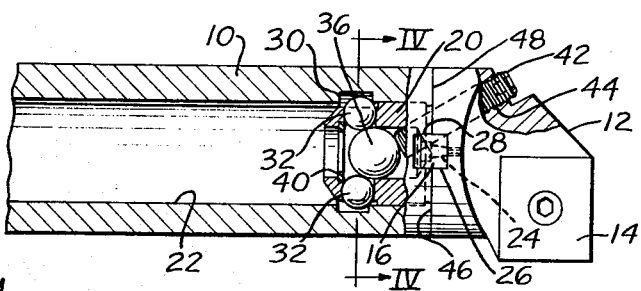
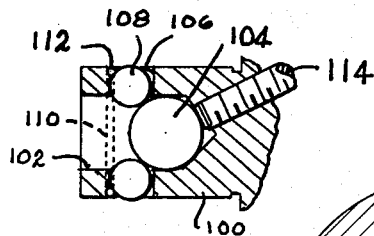
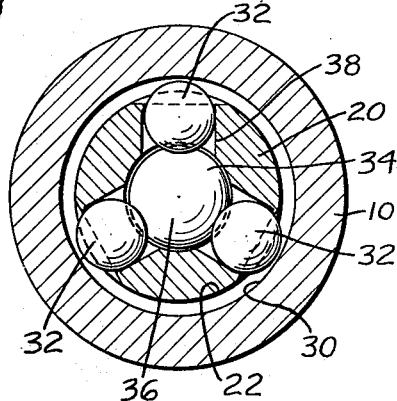
INVENTOR.
JAMES F. McCREERY
BY March 3, 1970  J. F. McCREERY  3,498,653
CONNECTOR DEVICE
Filed Aug. 16, 1968  2 Sheets-Sheet 2
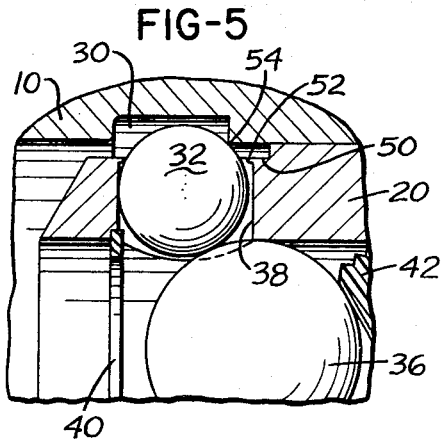
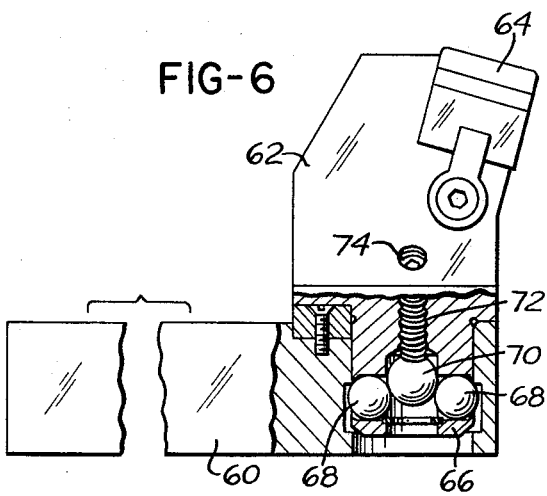
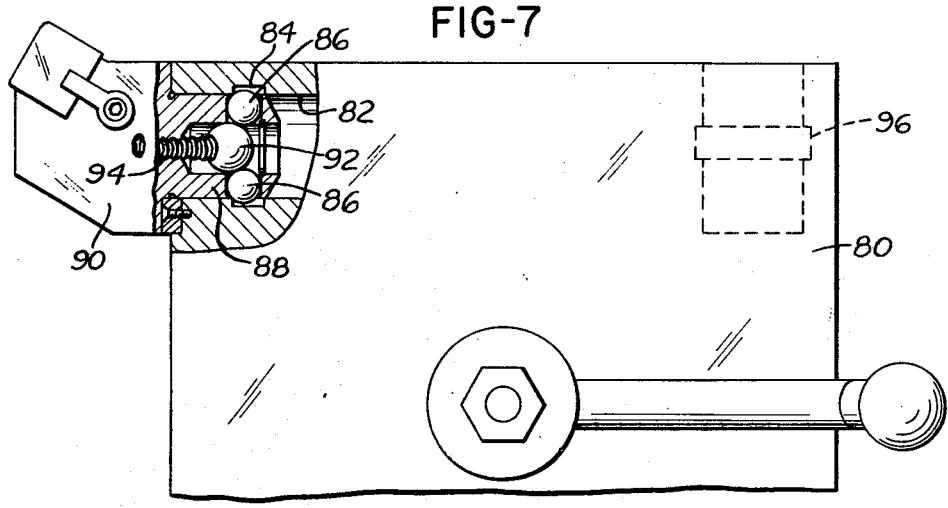
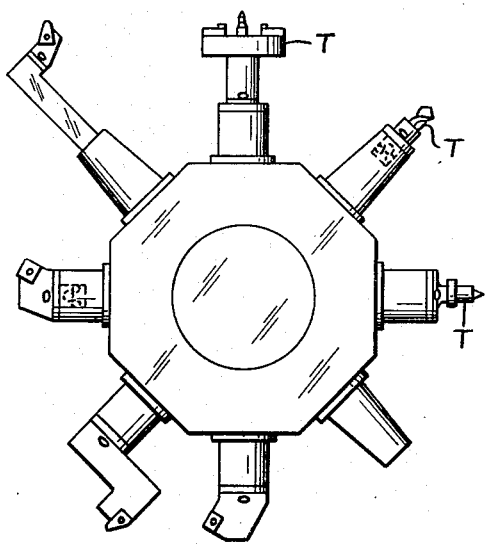
INVENTOR.
JAMES F. McCREERY

United States Patent Office 3,498,653
Patented Mar. 3, 1970

3,498,653
CONNECTOR DEVICE
James F. McCreery, Greensburg, Pa., assignor to Kennametal Inc., Latrobe, Pa., a corporation of Pennsylvania
Filed Aug. 16, 1968, Ser. No. 753,169
Int. Cl. F16d 1/12; F16b 2/16
U.S. Cl. 287—119          5 Claims

ABSTRACT OF THE DISCLOSURE

Arrangement for connecting parts, especially parts of tools, together in which one part has a bore to receive a shank formed on the other part. The bore has a groove therein and the shank has radially movable balls therein which can be forced radially outwardly to engage the groove and lock the parts together.

---

The present invention relates to a connecting arrangement especially adapted for connecting parts of cutting tools together.

In the art of cutting tools it is quite often the case that a support or holder is adapted for detachably receiving a support head for an element so that the tool element may be readily interchanged to replace a dull tool element with a sharpened one or to replace a tool element with a tool element of another type merely by replacing the support head which is already provided with a cutting insert. In some cases a main holder element is provided which is too hard to be machined and in such a case, a cutting tool element is necessarily supported on a steel member which is detachably connected to the holder element.

The present invention is particularly concerned with a novel, quick acting connecting arrangement for making connections of the type referred to above.

A particular objective of the present invention is to provide a connecting device of the general nature referred to which is extremely fast in operation and which supports the parts connected thereby extremely firmly.

A still further objective of the present invention is the provision of a connecting arrangement for connecting a support head for a cutting tool element to a main supporting holder in which the connecting arrangement is fast operating and serves accurately to locate the cutting tool element on the main holder.

A still further objective of this invention is the provision of a connecting device of the general nature referred to which is relatively inexpensive to manufacture and which has long life and which maintains its efficiency throughout its life.

The foregoing objectives of the present invention as well as still other objectives and advantages thereof will become more apparent upon reference to the following detailed specification, taken in connection with the accompanying drawings in which:

FIGURE 1 is a perspective view showing a boring bar having a replacable end part, or head, supporting a cutting element with the end part, or head, secured to the shank of the boring bar by a connecting device according to the present invention;

FIGURE 2 is an end view looking in at the right end of FIGURE 1 showing in more detail the construction of the end part, or head, for the boring bar;

FIGURE 3 is a sectional view indicated by line III—III on FIGURE 2 and illustrating more in detail the connecting device according to the present invention;

FIGURE 4 is a transverse sectional view indicated by line IV—IV on FIGURE 3;

FIGURE 5 is a fragmentary view drawn at enlarged scale showing details on the connecting device of the present invention;

FIGURE 6 is a view, partly in section, showing a different use of the connecting device;

FIGURE 7 is a schematic view showing a portion of a turret for a lathe, for example, illustrating how a connective device according to the present invention could be incorporated therein;

FIGURE 8 is a view showing a multi-sided turret and illustrating how the connecting device of the present invention permits a great many tools to be mounted around the periphery of the turret;

FIGURE 9 is a fragmentary sectional view showing a slightly different modification of the connecting device.

Referring to the drawings in somewhat more detail, in FIGURE 1, 10 represents the shank of a boring bar and 12 represents a replaceable head part for mounting on the end of shank 10. Part 12 carries a cutting insert 14 and is keyed to shank 10 as by key 16. Shank 10 may be a hard steel or it may be cemented tungsten carbide. When the shank is made of carbide or a hard steel, machining thereof is difficult and for this reason the end part 12 is made of a machinable steel which can be shaped for supporting the insert 14 in the proper position. The end part 12 is fixedly secured to the shank 10 and to form a rigid unit therewith, shank 10 is then clamped in a machine tool or the like and operates to machine work pieces.

The end view of the boring bar in FIGURE 2 will show how the insert 14 is supported so as to present a corner, or edge, at 18 to the work to be machined.

Referring now to FIGURE 3, the connecting device by means of which the end part 12 is fixedly connected to shank 10 is illustrated in detail. It will be seen in FIGURE 3 that part 12 has a cylindrical shank portion 20 projecting therefrom and closely fitting in cylindrical bore 22 in the shank 10 of the boring bar. FIGURE 3 will also show that key 16 is held on part 12 as by a screw 24 and that the key rests partly in keyway 26 in part 12 and partly in keyway 28 formed in the end of shank 10. Key 16 locks end part 12 to shank 10 so as to prevent rotation of end part 12 on the shank 10 when the boring bar is in operation.

Spaced from the head end of shank 10 is an internal annular groove 30 opening toward the axis of shank 10. This groove forms a shoulder facing away from the head end of the shank and in a plane perpendicular to the axis of shank 10. The said shoulder is adapted for engagement by balls 32 carried by cylindrical shank portion 20 of end part 12.

As will be seen in FIGURES 3 and 4, the cylindrical shank portion 20 of end part 12 has a central axial bore 34 extending into portion 20 from its end opposite the end part 12. Within this bore is loosely mounted a ball 36. Intersecting central bore 34 and located in a common plane are smaller radial bores 38 in which the aforementioned balls 32 are disposed. A snap ring 40 is seated in a groove provided therefor in bore 34 and serves to retain the aforementioned balls in assembled relation with the cylindrical portion 20 of end part 12.

An actuating screw 42 extends through a threaded bore 44 in end part 12 so that the outer end of the screw is accessible from externally of the boring bar, while the inner end of the screw is adapted for engaging the larger actuating ball 36.

At this point it will be apparent that, if screw 42 is retracted, ball 36 can retract and, the balls 32 can move inwardly in their bores 38 and thus permit cylindrical portion 20 either to be withdrawn from or introduced into the cylindrical bore 22 in shank 10. When the portion 20 is placed in shank 10 up to the point that shoulder 46 on end part 12 abuts or is quite near to the end face 48 of the shank 10, screw 42 can be tightened up and this will cause ball 36 to move to the left, as viewed in FIGURE 3, so as to force balls 32 radially outwardly and into engagement with shoulder formed by groove 30. Engagement of the shoulder by balls 32 will fixedly hold end part 12 on shank 10 and key 16 will prevent any rotation of end part 12 on shank 10.

Referring to FIGURE 5, it will be observed that the cylindrical portion 20 is preferably provided with flats machined thereon at 50 at the outer ends of bores 38. With the flats machined in the manner illustrated it becomes possible to coin member 20 at the outer ends of bores 38 thereby to provide an inwardly projecting flange-like rim 52 at the outer end of each bore 38 which will prevent the respective ball 32 from dropping out of the bore when the part 12 is removed from shank 10.

FIGURE 5 will also show that the corner of groove 30 at 54, which forms the aforementioned shoulder, and which is engaged by balls 32 is relatively sharp and so that all of the balls 32 will engage the corner at the same time. When balls 32 are forced radially outwardly by axial movement of actuating ball 36, the balls 32 will engage the shoulder 54 of groove 30 and will pull end part 12 firmly against the end of shank 10.

The distance of corner 54 from the end of the shank is selected so that the balls 32 will not bottom in groove 30, but will remain in engagement with corner 54 when screw 42 is drawn up tight. The end part is thus maintained on shank 10 under axial tension so that it is seated properly and firmly on the end of the shank and remains so seated during use of the boring bar. If at any time it is desired to remove end part 12 from shank 10, screw 42 is loosened up and the end part 12 can easily be drawn from the end of the boring bar.

FIGURE 6 shows a different type support bar 60 receiving a member 62 which carries a cutting insert 64. Member 62 has a cylindrical shank portion 66 thereon constructed in the same way as the cylindrical shank portion 20 of the end part 12 for the boring bar above described. The cylindrical shank portion 66 carries the radially movable balls 68 and the axially movable actuating ball 70 which is actuated by screw 72, the head of which, at 74 is accessible from the front side of member 62.

FIGURE 7 shows how a square turret 80 could be provided with bores 82 each thereof having an internal annular groove at 84 for receiving radially movable balls 86 carried in the cylindrical extension, on shank portion, 88 provided on the back of the insert supporting member 90. Balls 86 are adapted for actuation by ball 92, which come in turn, is actuated by screw 94. In the turret of FIGURE 7 there would be provided at least four of the bores 82, a second thereof being indicated in dotted outline at 96 on another corner of the turret.

It will be appreciated that the connecting arrangement in the present invention is extremely compact and takes no space over and above what is required for the member supporting the insert. For this reason the connecting device of the present invention is particularly well adapted for mounting a multiplicity of tools on a turret as shown in FIGURE 8.

In FIGURE 8 a plurality of tools, indicated at T, on various types, are secured to the several faces 98 of the turret 100 by connecting devices according to the present invention, not illustrated in detail.

It will be appreciated that much space is saved by using the connecting device of the present invention in addition to the time that is saved in mounting and dismounting and replacing tools. Still further, the tools are extremely tightly fixed in placed by the use of the connecting device of the present invention so that they are accurately located and do not tend to become loose in use.

The shank portion and the bore in which it is received have been shown as cylindrical but other cross sectional shapes are, of course, possible.

Further, the lock means are shown in the form of balls but other types of locking elements could be employed, such as a plunger having rounded outer ends, for example. Also, the actuating means is shown as a ball and screw but inasmuch as the actuating ball has a cam action to move the locking elements outwardly, cams of other shapes could also be used. The balls shown have the pronounced merit of being inexpensive and dimensionally precise and are the preferred types of members to employ as the locking and actuating members.

In FIGURE 9, the shank portion of the one member is shown at 100 and it is provided with an axial bore 102 in which ball 104 fits relatively closely but freely axially movable.

Radial bore 106 intersect axial bore 102 and may, for example, consist of three bores equally spaced circumferentially of shank 100. The smaller lock balls 108 fit bores 106 relatively closely but are freely reciprocal therein. In the modifications of FIGURE 9, the shank 100 fits annular groove 110 in which is mounted a snap ring 112. Snap ring 112 intersects radial bores 106 at one side thereof and prevents balls 108 from dropping out of bores 106. Balls 108 are so selected that they project into bore 102 and thus prevent ball 104 from dropping from bore 102. A screw threaded actuating member 114 is threaded into the member in such a manner that the inner end thereof engages ball 104 so that the fitted ball can be moved in bore 102 in the manner previously described in connection with the other modifications.

The modifications of FIGURE 9 embody all of the functions of the previously described modifications but is somewhat simpler and more inexpensive to manufacture.

Certain specific embodiments of the present invention have been illustrated in the accompanying drawings and described in the preceding specification, but modifications and adaptations on the present invention coming within the scope of the appended claims will occur to those skilled in the art.

What is claimed is:

1. In combination: a first member having a bore extending therein from a wall thereof perpendicular to said wall and a shoulder formed in said bore in a plane perpendicular to the axis of said bore and facing away from said wall, a second member having a shank portion projecting therefrom and closely fitting said bore, said second member having a surface thereon perpendicular to the axis of said shank portion and adapted to abut said wall of said first member when said shank portion is in a predetermined position in said bore, substantially radial hole means in said shank portion opening outwardly at the periphery of said shank portion, lock means closely slidably fitting said hole means and convex on the outer end, said shank portion when in said predetermined position locating said lock means so that in a radially outer position thereof said shoulder engages said lock means between the center of the convex outer end thereof and the side of the lock means nearest said wall, and actuating means carried by said second member operable for engaging and positively moving said lock means radially outwardly in said hole means in said shank portion of said second member into shoulder engaging position to fix said members together while simultaneously drawing the said surface of said second member into firm engagement with said wall of said first member, said actuating means also being operable for releasing said lock means for movement thereof radially inwardly away from shoulder engaging position, said hole means in said shank portion of said second member comprises coplanar radial holes disposed at angles to each other, said lock means comprising a first ball fitted relatively closely in each said radial hole, said shank portion having a central axial bore therein intersecting said radial holes, and said actuating means including a second ball in said axial bore adapted to engage the inner sides of said first balls and force them radially outwardly in their respective radial holes, said actuating means including screw threaded means in said second member for moving said second ball axially in said axial bore, and retaining means at the outer end of each said radial hole to prevent said first balls from dropping therefrom when said shank is withdrawn from said bore in said first member, said bore in said first member and said shank portion of said second member being cylindrical, and a key interlocking said members against relative rotation.

2. The combination according to claim 1 in which said shank portion of said second member has flats machined thereon at the outer ends of said radial holes and said retaining means is in the form of a coined region at the outer end of each radial hole which reduces the hole diameter at the extreme outer end to less than that of the ball in the respective hole.

3. The combination according to claim 1 which includes an annular groove in the bore in said first member and the side of the groove nearest said wall of said first member forming said shoulder.

4. The combination according to claim 1 in which said axial bore in the shank portion of said second member is in the form of a blind hole extending into said shank portion from the outer end thereof opposite the end connected to said second member, and means in said axial bore at the outer end of said shank portion for retaining the said balls in assembled relation with said shank portion.

5. The combination according to claim 1 in which said retaining means comprises snap ring means on said shank intersecting said radial holes at the outer ends thereof, said shank being provided with annular groove means in which said snap ring means are disposed.

References Cited

UNITED STATES PATENTS

| | | | |
|---|---|---|---|
| 576,500 | 2/1897 | Strauss | 308—201 |
| 949,083 | 2/1910 | Mossberg. | |
| 1,243,338 | 10/1917 | O'Grady. | |
| 1,918,438 | 7/1933 | Unger. | |
| 2,162,359 | 6/1939 | Rhinevault | 287—119 |
| 3,043,563 | 7/1962 | Gray et al. | 85—58 XR |
| 3,073,192 | 1/1963 | Beers | 287—53 XR |
| 3,288,501 | 11/1966 | Ross et al. | |

FOREIGN PATENTS 663,801　8/1938　Germany.

REINALDO P. MACHADO, Primary Examiner

A. V. KUNDRAT, Assistant Examiner

U.S. Cl. X.R.

85—5